United States Patent
Wang et al.

(10) Patent No.: US 8,976,546 B2
(45) Date of Patent: Mar. 10, 2015

(54) CONTROL INTEGRATED CIRCUIT OF A SWITCH POWER SUPPLY AND A SWITCH POWER SUPPLY USING THE SAME

(75) Inventors: Wenqing Wang, Guangdong (CN); Xiaohua Yang, Guangdong (CN); Chuntian Yu, Guangdong (CN); Yuming Feng, Guangdong (CN)

(73) Assignees: Shenzhen BYD Auto R&D Company Limited, Shenzhen, Guangdong (CN); BYD Company Limited, Shenzhen, Guangdong (CN)

( * ) Notice: Subject to any disclaimer, the term of this patent is extended or adjusted under 35 U.S.C. 154(b) by 302 days.

(21) Appl. No.: 13/561,354

(22) Filed: Jul. 30, 2012

(65) Prior Publication Data

US 2013/0027985 A1   Jan. 31, 2013

(30) Foreign Application Priority Data

Jul. 29, 2011   (CN) .......................... 2011 1 0215457

(51) Int. Cl.
*H02M 3/335* (2006.01)
*H02M 1/00* (2006.01)

(52) U.S. Cl.
CPC .. *H02M 3/33507* (2013.01); *H02M 2001/0003* (2013.01)
USPC .................................... 363/21.12; 363/21.18

(58) Field of Classification Search
CPC .............................................. H02M 2001/0032
USPC ................................ 363/21.12, 21.15–21.18
See application file for complete search history.

(56) References Cited

U.S. PATENT DOCUMENTS

| 8,018,743 | B2 * | 9/2011 | Wang et al. | 363/21.18 |
| 8,045,348 | B2 * | 10/2011 | Zhu et al. | 363/49 |
| 8,199,533 | B2 * | 6/2012 | Shimada | 363/21.01 |
| 8,289,732 | B2 * | 10/2012 | Li et al. | 363/21.12 |

(Continued)

FOREIGN PATENT DOCUMENTS

| CN | 1473387 A | 2/2004 |
| CN | 200969527 Y | 10/2007 |

(Continued)

OTHER PUBLICATIONS

PCT International Search Report and Written Opinion mailed Oct. 25, 2012, issued in International Application No. PCT/CN2012/079294 (11 pages).

*Primary Examiner* — Timothy J Dole
*Assistant Examiner* — Yusef Ahmed
(74) *Attorney, Agent, or Firm* — Finnegan, Henderson, Farabow, Garrett & Dunner, LLP

(57) ABSTRACT

A control integrated circuit for controlling a switch power supply, including: a voltage collecting module, configured to collect a feedback voltage based on an output voltage of the switch power supply; an error amplifying module, configured to compare the feedback voltage with a reference voltage and generate an error voltage; a time collecting module, configured to obtain a degaussing time signal based on the feedback voltage; and a constant voltage and current module, configured to collect a peak current feedback signal of a switch transistor, generate a control signal based on the error voltage, the degaussing time signal and the peak current feedback signal, wherein the control signal is for controlling an operating frequency and a duty ratio of the switch transistor, and control the switch transistor according to the control signal.

22 Claims, 5 Drawing Sheets

(56) References Cited

U.S. PATENT DOCUMENTS

| | | | |
|---|---|---|---|
| 2006/0198167 A1* | 9/2006 | Nakamura | 363/16 |
| 2007/0253228 A1* | 11/2007 | Morota et al. | 363/21.12 |
| 2008/0180078 A1 | 7/2008 | Hiasa | |
| 2009/0059632 A1 | 3/2009 | Li et al. | |
| 2009/0134859 A1* | 5/2009 | Shiroyama | 323/282 |
| 2010/0208500 A1* | 8/2010 | Yan et al. | 363/21.12 |
| 2010/0225293 A1* | 9/2010 | Wang et al. | 323/290 |
| 2010/0244804 A1* | 9/2010 | Zong et al. | 323/299 |
| 2010/0259952 A1* | 10/2010 | Zhu et al. | 363/20 |
| 2010/0309690 A1* | 12/2010 | Kawabe et al. | 363/21.01 |
| 2011/0096573 A1* | 4/2011 | Zhu et al. | 363/21.17 |
| 2011/0103101 A1* | 5/2011 | Hiasa | 363/21.12 |
| 2011/0122659 A1* | 5/2011 | Duan et al. | 363/21.16 |
| 2011/0286248 A1* | 11/2011 | Wang et al. | 363/21.18 |
| 2012/0134182 A1* | 5/2012 | Zhu et al. | 363/21.17 |
| 2012/0195075 A1* | 8/2012 | Nate | 363/21.01 |
| 2013/0148387 A1* | 6/2013 | Ren et al. | 363/21.16 |

FOREIGN PATENT DOCUMENTS

| | | |
|---|---|---|
| CN | 101677214 A | 3/2010 |
| CN | 201430530 Y | 3/2010 |
| CN | 201540530 U | 8/2010 |
| CN | 101860243 A | 10/2010 |
| CN | 101924471 A | 12/2010 |
| WO | WO 2007/003967 A2 | 1/2007 |
| WO | WO 2013/017050 A1 | 2/2013 |

* cited by examiner

CONTROL INTEGRATED CIRCUIT OF A SWITCH POWER SUPPLY AND A SWITCH POWER SUPPLY USING THE SAME

CROSS-REFERENCE TO RELATED APPLICATION

This application claims priority under 35 U.S.C. §119 of Chinese Patent Application No. 201110215457.0, filed on Jul. 29, 2011, the content of which is incorporated herein by reference in its entirety.

TECHNICAL FIELD

Exemplary embodiments of the present disclosure relate generally to a control integrated circuit, and more particularly, to a control integrated circuit of a switch power supply and a switch power supply using the same.

BACKGROUND

Almost all household appliances require using low voltage direct current (DC) power supplies as the appliances' main power supplies or the controller power supplies. But city power grids can only provide either 220V or 110V alternating current (AC) power supply because of the inherent voltage transmission loss problem. Therefore, highly efficient and cost-effective AC-DC converters are needed. Traditional AC-DC converters are usually linear converters, which have several drawbacks including their large volume, heavy weight, low conversion efficiency and no-longer obvious cost advantage. Thus, they are being phased-out in the industry. Nowadays, switch power supply converters become the mainstream AC-DC conversion devices. In order to meet the accuracy and isolation safety requirements, switch power supply converters having secondary feedback control are usually used.

SUMMARY

Consistent with the disclosed embodiments, there is provided a control integrated circuit for controlling a switch power supply. The control integrated circuit comprises: a voltage collecting module, configured to collect a feedback voltage based on an output voltage of the switch power supply; an error amplifying module, configured to compare the feedback voltage with a reference voltage and generate an error voltage; a time collecting module, configured to obtain a degaussing time signal based on the feedback voltage; and a constant voltage and current module, configured to collect a peak current feedback signal of a switch transistor, generate a control signal based on the error voltage, the degaussing time signal and the peak current feedback signal, wherein the control signal is for controlling an operating frequency and a duty ratio of the switch transistor, and control the switch transistor according to the control signal.

Consistent with the disclosed embodiments, there is provided a switch power supply. The switch power supply comprises: a control integrated circuit for controlling a switch power supply as disclosed above; an input filter and rectification module, configured to filter a first alternating current (AC) voltage for obtaining desired frequencies and convert the first alternating current (AC) voltage to a first direct current (DC) voltage; a primary winding, configured to convert the first DC voltage to an electromagnetic signal, wherein the conversion is controlled by the switch transistor; a power supply module, configured to provide a power supply voltage to the control integrated circuit; a primary side feedback module, configured to divide the power supply voltage and provide the divided power supply voltage to the control integrated circuit; a primary collecting module, configured to collect the peak current feedback signal; a secondary winding, configured to convert the electromagnetic signal to an electric signal and generate a second AC voltage corresponding to the electric signal; an output rectification module, configured to convert the second AC voltage to a second DC voltage; a voltage regulating module, configured to store the energy provided by the output rectification module and provide output power for stabilizing an output DC voltage of the switch power supply when the switch transistor is turned off; and a dummy load module, configured to consume energy generated by the secondary winding when the switch power supply carries no load.

The error amplifying module compares the feedback voltage collected by the voltage collecting module and a reference voltage, and generates an error voltage, which can be used to determine the load condition of the switch power supply. Consequently, based on the load condition of the switch power supply, the degaussing time signal, and the switch transistor's peak current feedback signal, the frequency and duty ratio of the control signal can be adjusted for generating a constant voltage and current output. In addition, the operating frequency of the control integrated circuit can be reduced when the system has a decreased load condition. Accordingly, the standby power consumption can be reduced because the switching loss of the switch power supply is reduced.

BRIEF DESCRIPTION OF THE DRAWINGS

Figure 1:
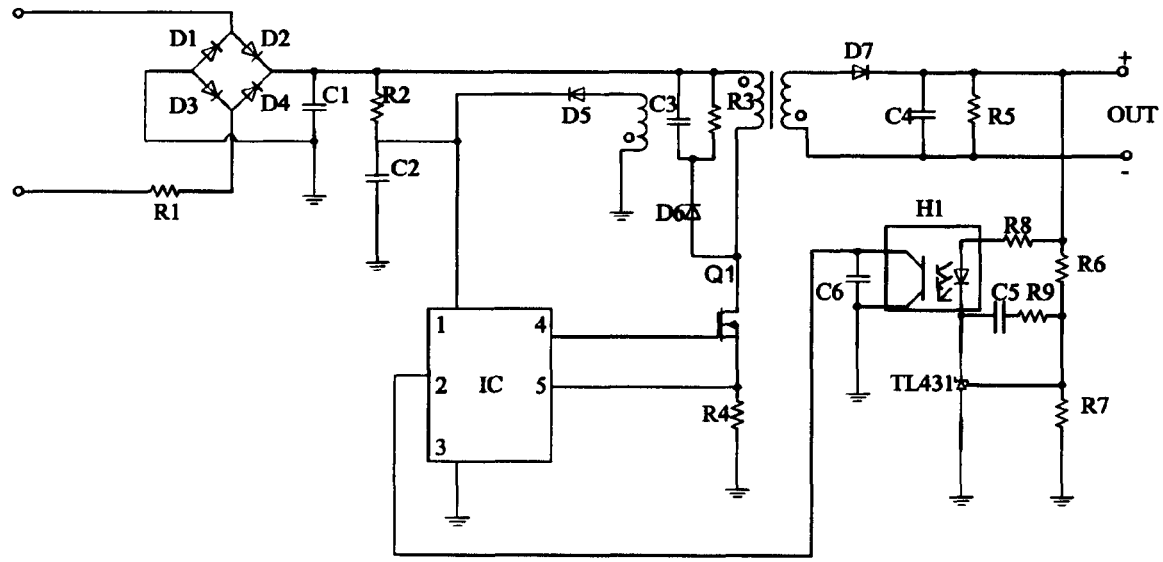
Figure 2:
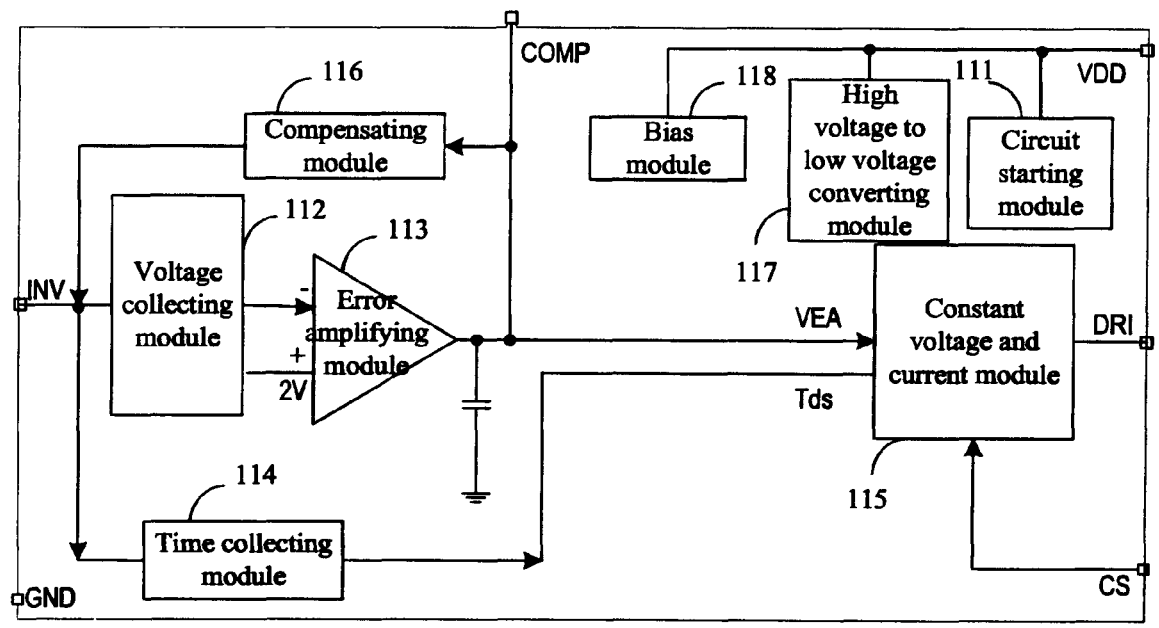
Figure 3:
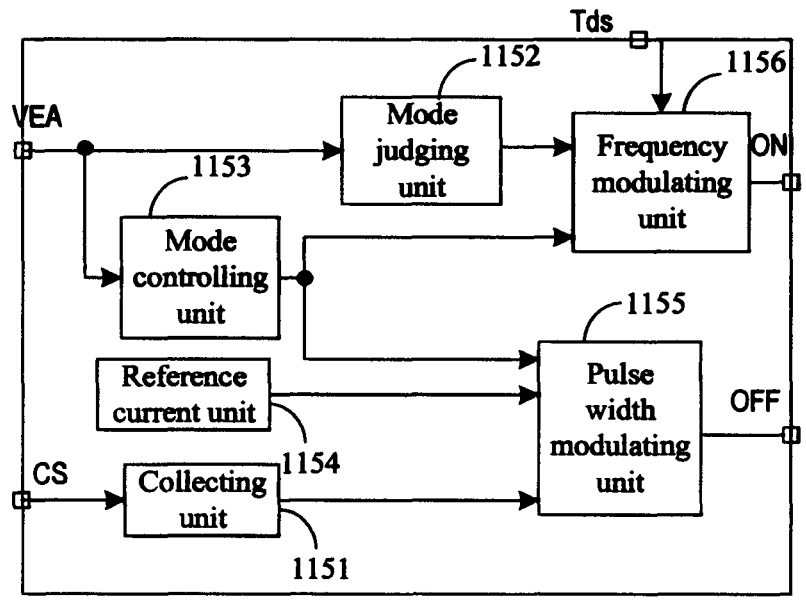
Figure 4:
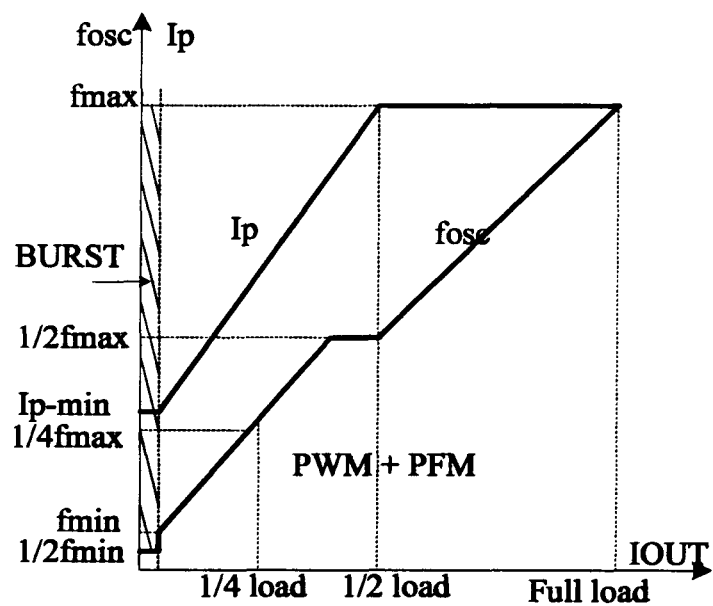
Figure 5:
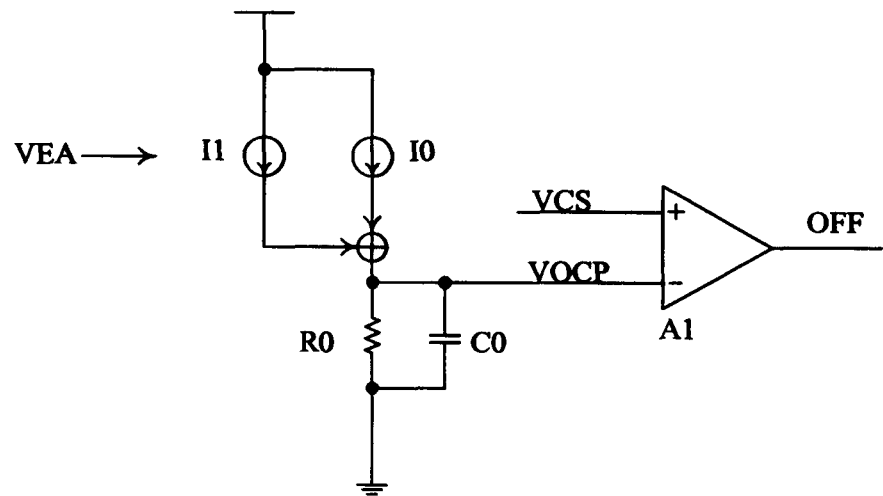
Figure 6:
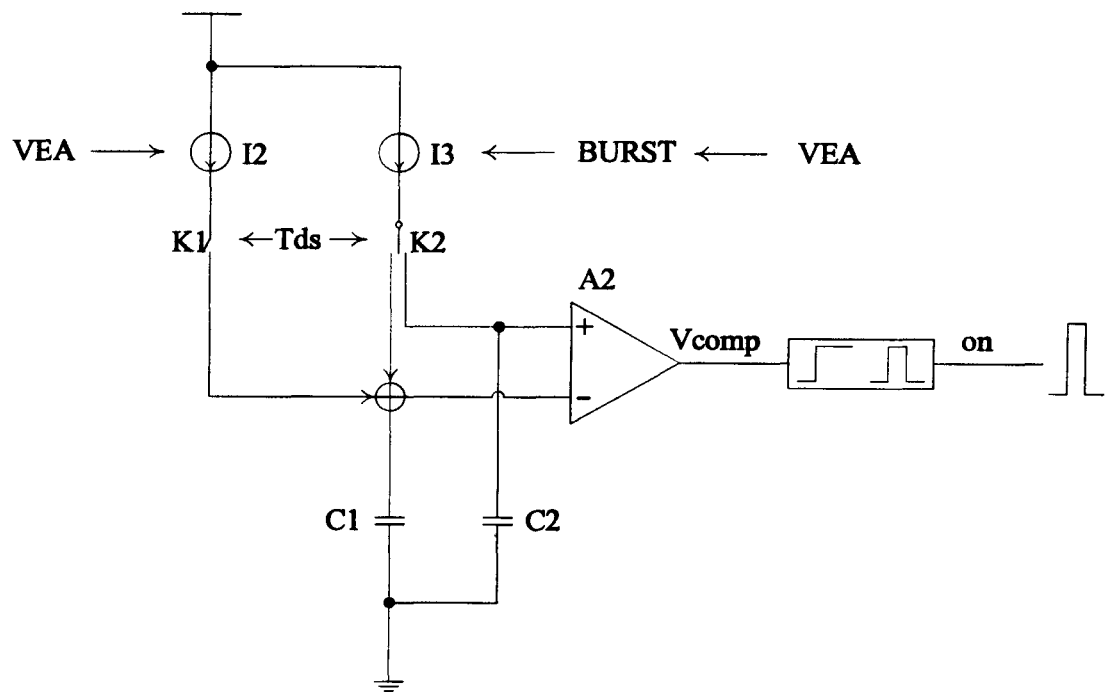
Figure 7:
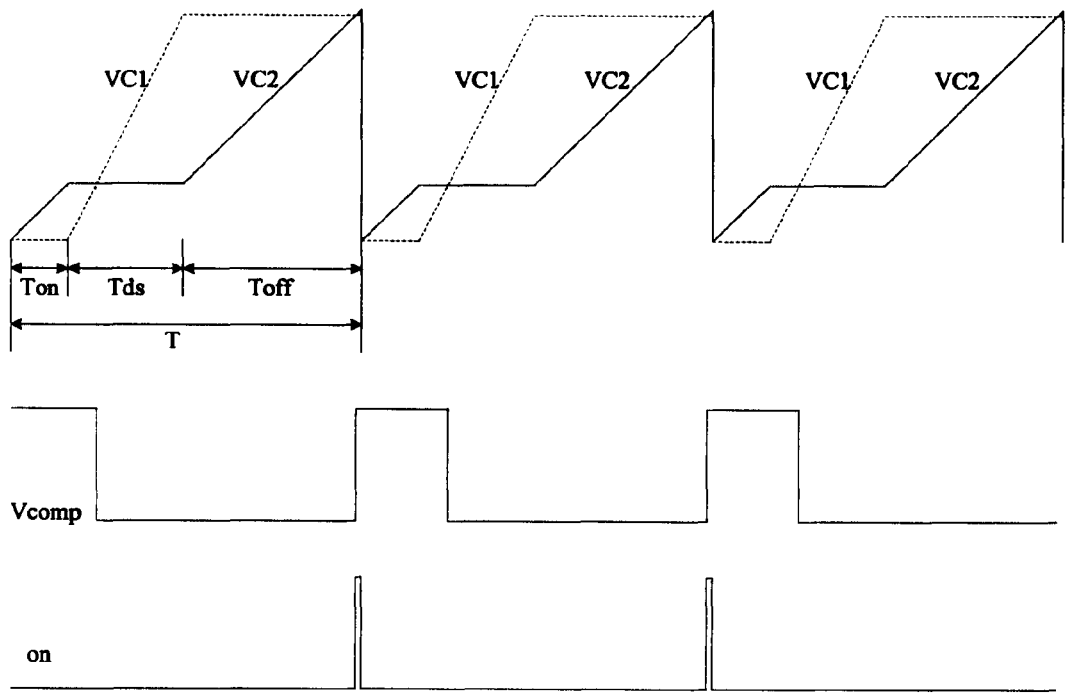
Figure 8:
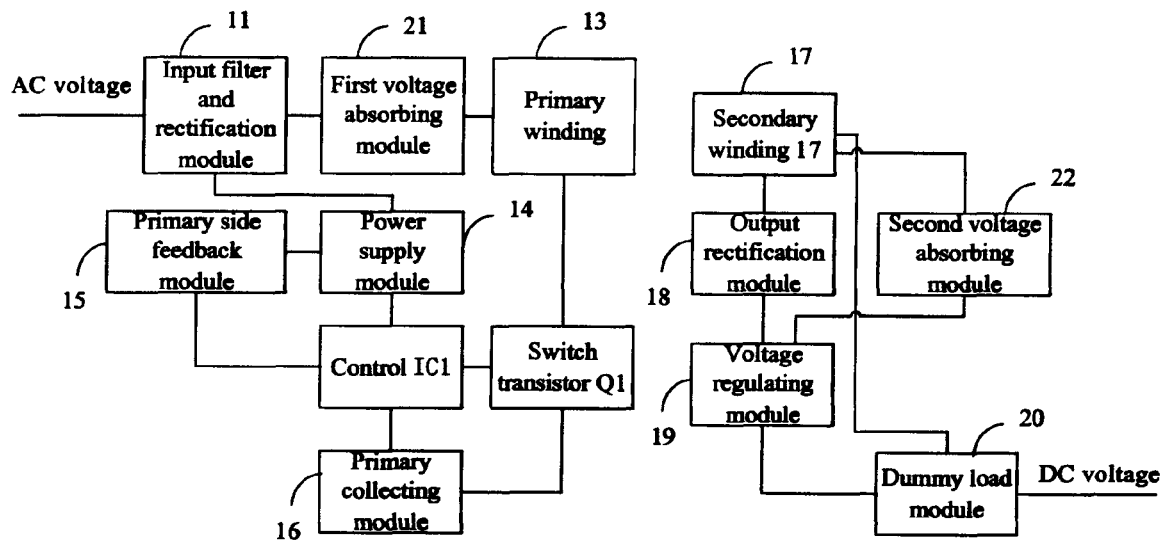
Figure 9:
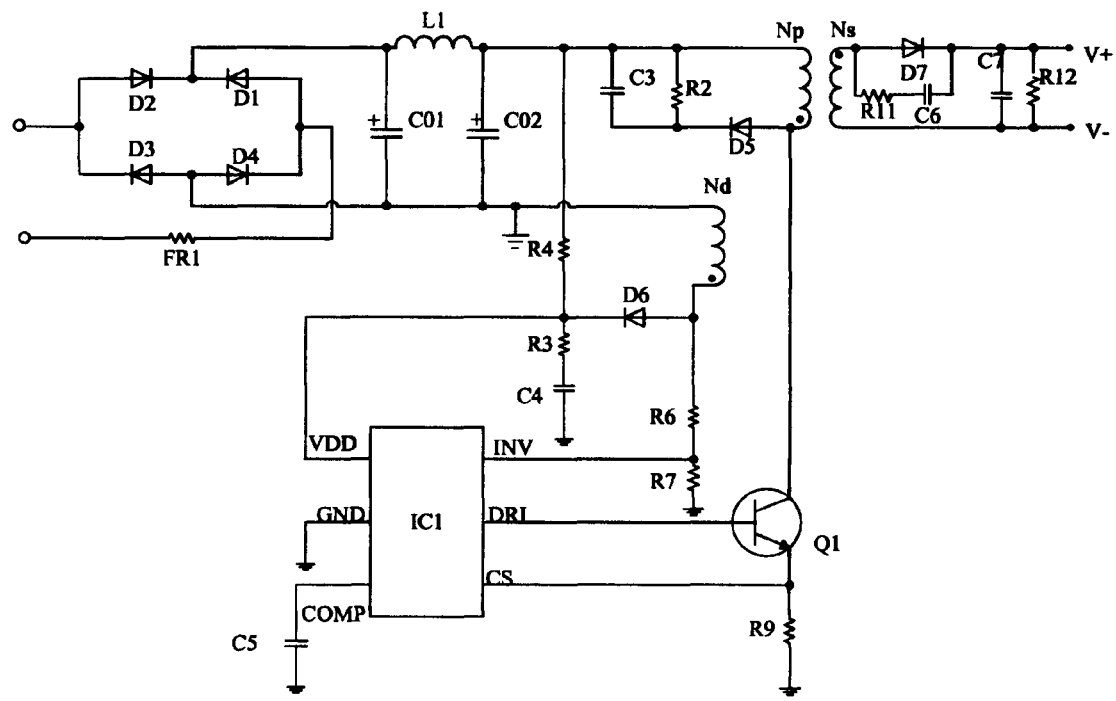

Having thus described exemplary embodiments of the present disclosure in general terms, reference will now be made to the accompanying drawings, which are not necessarily drawn to scale, and wherein:

FIG. 1 illustrates a circuit diagram of a prior art switch power supply;

FIG. 2 illustrates a block diagram of an exemplary control integrated circuit (IC) for a switch power supply according to an exemplary embodiment;

FIG. 3 illustrates a block diagram of an exemplary embodiment of a constant voltage and current module shown in FIG. 2;

FIG. 4 is an exemplary diagram illustrating the variation of the control IC's operating frequency (fosc) and peak primary winding current (Ip) in relation to load current (Iout);

FIG. 5 illustrates an exemplary circuit diagram corresponding to a Pulse Width Modulation (PWM) mode;

FIG. 6 illustrates an exemplary circuit diagram corresponding to a Pulse Frequency Modulation (PFM) mode or a BURST mode;

FIG. 7 illustrates a timing diagram of an exemplary constant voltage and current module operating under the PFM/BURST mode, corresponding to the circuit shown in FIG. 6;

FIG. 8 illustrates a block diagram of an exemplary switch power supply according to an exemplary embodiment;

FIG. 9 illustrates a circuit diagram of an exemplary switch power supply corresponding to the block diagram shown in FIG. 8.

DETAILED DESCRIPTION

Reference will now be made in detail to exemplary embodiments, examples of which are illustrated in the accompanying drawings. It is readily appreciated by those having ordinary skill in the art that the presently claimed subject matter may be embodied in many different forms and should not be construed as limited to the embodiments set forth herein.

FIG. 1 shows a prior art switch power supply circuit with a feedback control. An AC power supply voltage passes through a full-wave rectifier (i.e., diodes D1-D4), which converts the AC power supply voltage to a high DC voltage. The DC voltage is stored in a capacitor C1. The operating power of an control integrated circuit (IC) is provided through a resistor R2 and a capacitor C2. At an output side, an output voltage is divided by resistors R6 and R7, amplified by a regulator TL431 and transmitted to the voltage sampling terminal of the control IC by an optocoupler H1. Based on the sampled output voltage, the control IC adjusts the conducting time and operating frequency of a switch transistor Q1 in order to adjust the energy stored in a primary winding in a present cycle. As a result, a closed-loop negative feedback system is formed for stabilizing the output voltage. This type of switch power supply circuit, however, has high standby power consumption because the required operating current of the optocoupler H1 and the regulator TL431 are both above 1 mA.

FIG. 2 illustrates a block diagram of an exemplary control integrated circuit (IC) of a switch power supply according to an exemplary embodiment. The control integrated circuit connects to a switch transistor of a switching power supply and includes: a voltage collecting module 112, configured to collect a feedback voltage based on an output voltage of the switch power supply; an error amplifying module 113, configured to compare the feedback voltage with a reference voltage and generate an error voltage; a time collecting module 114, configured to obtain a degaussing time signal based on the feedback voltage; and a constant voltage and current module 115, configured to collect a peak current feedback signal of a switch transistor, generate a control signal based on the error voltage, the degaussing time signal and the peak current feedback signal, wherein the control signal is for controlling an operating frequency and a duty ratio of the switch transistor, and control the switch transistor according to the control signal.

A degaussing time signal Tds generated by the time collecting module 114 is obtained based on the feedback voltage, which is collected by the voltage collecting module 112 and determined based on the output voltage of the switch power supply. As will be discussed in association with FIG. 9, when a switch transistor Q1 is turned on, an auxiliary winding Nd couples with a primary winding Np of a transformer and the feedback voltage collected by the voltage collecting module 112 is a negative voltage. When the switch transistor Q1 is turned off and a diode D7 is turned on, the output voltage of a secondary winding Ns of a transformer is the output voltage of the switch power supply, and the auxiliary winding Nd couples with the secondary winding. Thus, the feedback voltage is a positive voltage. When the switch transistor is turned on and the diode D7 is turned off, the feedback voltage is an oscillatory voltage. Accordingly, when the voltage collecting module 112 collects the feedback voltage, the degaussing time signal Tds (i.e., the diode's turn-on time) is also obtained.

The error amplifying module 113 compares the feedback voltage collected by the voltage collecting module 112 and a reference voltage (e.g., a 2V voltage), and generates an error voltage, which can be used to determine the load condition of the switch power supply. Consequently, based on the load condition of the switch power supply, the degaussing time signal, and the switch transistor's peak current feedback signal, the frequency and duty ratio of the control signal can be adjusted to generate a constant voltage and current output. In addition, the operating frequency of the control IC can be reduced when the system has a decreased load condition. Accordingly, the standby power consumption can be reduced because the switching loss of the switch power supply is reduced.

As shown in FIG. 2, VDD is a power supply terminal; GND is an electrical ground; COMP is a compensation terminal; CS is a collecting terminal of the peak current feedback signal; INV is a collecting terminal of the feedback voltage; and DRI is a driving terminal for driving the switch transistor.

In some exemplary embodiments, the control IC further comprises a compensating module 116, configured to compensate the feedback voltage, which is collected by the voltage collecting module 112, according to the error voltage generated by the error amplifying module 113. Consequently, different voltage compensations can be obtained depending on different load conditions. When the load increases, the voltage compensation can increase correspondingly. The voltage compensation compensates the voltage loss in the conducting wire.

In some exemplary embodiments, the control IC further comprises a circuit starting module 111, configured to generate an enable signal when the voltage of a power supply module is equal to or greater than a preset startup voltage and provide power to voltage collecting module 112, error amplifying module 113, time collecting module 114 and constant voltage and current module 115; wherein the constant voltage and current module 115 is configured to provide the control signal when receiving the enable signal. When the control IC powers on and the voltage of the power supply module starts to increase, the circuit starting module 111 resets the other modules of the control IC. When the voltage of the power supply module is equal to or greater than a preset value, the circuit starting module 111 generates the enable signal and the control IC starts to operate and generate the control signal, which controls the operation of the switching transistor.

In some exemplary embodiments, the control IC further comprises a high voltage to low voltage converting module 117, configured to provide operating power and an enable signal to the low voltage part of the control IC based on the output voltage level of the power supply module; and a reference and bias module 118, configured to provide a reference voltage and a bias voltage.

FIG. 3 illustrates a block diagram of an exemplary embodiment of the constant voltage and current module 115 shown in FIG. 2. In FIG. 3, the constant voltage and current module 115 comprises: a collecting unit 1151, configured to collect the peak current feedback signal; a mode judging unit 1152, configured to modulate a judging current according to the error voltage VEA; a mode controlling unit 1153, configured to modulate a controlling current according to the error voltage VEA; a reference current unit 1154, configured to generate a preset current; a pulse width modulating unit 1155, configured to obtain a first comparison voltage VOCP (shown in FIG. 5) based on the controlling current that is superimposed with the preset current, and generate a turn-off pulse OFF for the control signal when the first comparison voltage VOCP equals the voltage of the peak current feedback signal VCS (shown in FIG. 5); and a frequency modulating unit 1156, configured to generate a turn-on pulse ON for the control signal based on the judging current, the controlling current and the degaussing time signal Tds.

In FIG. 3, when the pulse width modulating unit 1155 operates, the control IC enters the pulse width modulation (PWM) mode. When the frequency modulating unit 1156 operates, the control IC enters the pulse frequency modulation (PFM) mode. And the control IC enters the BURST mode (i.e., the hiccup mode or the skip-cycle mode) when both the pulse width modulating unit 1155 and the frequency modulating unit 1156 operate. Under the BURST mode, energy saving can be realized by periodic shielding of the output pulses under certain load conditions.

The output power P of the switch power supply equals U multiplied by I (i.e., P=U*I), where U is the output voltage and I is the output current of the switch power supply. Because the output power P is kept as a constant, when the system load increases, the output current I increases and thus the output voltage U decreases. Consequently, when the system load increases, the feedback voltage, which reflects the output voltage U and is collected by the voltage collecting module 112 shown in FIG. 2, is far less than the reference voltage. As a result, the error amplifying module 113 shown in FIG. 2 generates a high voltage level. For example, the value of the output error voltage VEA of the error amplifying module 113 equals VDD. When VEA, as an input to the mode judging unit 1152, is at the high voltage level, the mode judging unit 1152 maintains the judging current and provides the judging current to the frequency modulating unit 1156. Moreover, the mode controlling unit 1153 provides a maximum control current to the pulse width modulating unit 1155 and stops providing current to the frequency modulating unit 1156, so that the peak feedback voltage and the peak feedback current can be maintained. As a result, the peak current Ip of the primary winding can also be maintained and Tds/T is kept as a constant. Furthermore, according to a formula $$Iout = 0.5 \cdot \frac{NP}{NS} \cdot \frac{Tds}{T} \cdot Ip, \quad (1)$$

where NP is the number of turns of the primary winding and NS is the number of turns of the secondary winding, when the turns ratio NP/NS is a constant, the output current Iout of the switch power supply can be kept as a constant. Thus, if the output current Iout is a constant but the degaussing time signal Tds changes, the frequency modulating unit 1156 modulates the operating cycle T of the control IC, so that Tds/T is kept as a constant. In other words, because the operating cycle T is the inverse of the operating frequency fosc, the frequency modulating unit 1156 effectively modulates the operating frequency fosc. Accordingly, when the output current of the switch power supply is maintained, the control IC enters the PFM mode.

When the system load decreases, the feedback voltage, which reflects the output voltage U and is collected by the voltage collecting module 112 shown in FIG. 2, can gradually approach the reference voltage input to the error amplifying module 113 shown in FIG. 2. And the error voltage VEA, which is generated by the error amplifying module 113, decreases gradually from VDD. When VEA is less than V1, a preset voltage value, the operating conditions of both the pulse width modulating unit 1155 and the frequency modulating unit 1156 are adjusted according to the value of the error voltage VEA. In other words, the pulse width modulating unit 1155 carries out pulse width modulation and the frequency modulating unit 1156 carries out pulse frequency modulation. As a result, the output voltage of the switch power supply is stabilized by means of system negative feedbacks. When the error voltage VEA decreases to V2, another preset voltage value, the control IC reaches its adjustment limit under the PWM mode and the PFM mode. Consequently, if the system load decreases further, the output voltage of the switch power supply increases further and the error voltage VEA decreases further. When VEA is less than a preset voltage V4, the mode judging unit 1152 modulates its output judging current and the control IC enters the BURST mode. When the control IC operates under the BURST mode, it can carry out further frequency division based on its minimum operating frequency. If, however, the system load stops decreasing and instead increases, the output voltage of the switch power supply decreases and the error voltage VEA increases. When VEA increases to be greater than a preset voltage V3, the control IC no longer operates in the BURST mode. A time delay exists between the voltage V3 and the voltage V2. That is, there is a delay between the time VEA reaches V2 and the time VEA reaches V3, and the values of the voltage V1, V2, V3, and V4 decrease in the corresponding order.

FIG. 4 is an exemplary diagram illustrating the variation of the control IC's operating frequency (fosc) and peak primary winding current (Ip) in relation to load current (Iout). The shaded area in FIG. 4 indicates that the control IC operates under the BURST mode. The non-shaded area in FIG. 4 indicates that the control IC operates under the PWM mode and the PFM mode. When the control IC operates under the PWM mode and PFM mode (i.e., in the non-shaded area), the control IC's operating mode changes from PFM to PWM, and then to both PFM and PWM, corresponding to the decreasing of load. This type of control can better satisfy the dynamic performance requirements and also reduce the operating frequency under light load conditions. As a result, the control IC's operating efficiency can be improved. When the control IC operates under the BURST mode (i.e., in the shadowed area), the peak current Ip of the primary winding keeps at its minimum value, and the control IC's operating frequency changes to a half of the minimum operating frequency of the PFM mode. Thus, both the system switching loss and the dummy load loss can be reduced. Accordingly, the total power loss can be reduced when the switch power supply operates under the lightly loaded or unloaded conditions.

In some exemplary embodiments, as shown in FIG. 5 and FIG. 6, the mode controlling unit 1153 includes a first current source connected with the pulse width modulating unit 1155, being configured to increase a first output current I1 when the error voltage VEA increases; and a second current source connected with the frequency modulating unit 1156, being configured to increase a second output current I2 when the error voltage VEA decreases, stop providing the second output current I2 when the error voltage VEA equals a first preset voltage, and maintain the second output current I2 when the error voltage VEA is less than a second preset voltage. When the first preset voltage equals VDD, the second output current I2 equals zero. And when the error voltage VEA is less than V4, the second output current I2 is kept unchanged.

FIG. 5 illustrates an exemplary circuit diagram corresponding to the PWM mode. In FIG. 5, a reference current unit, such as the reference current unit 1154 shown in FIG. 3, is represented by a constant current source, which generates a preset current I0. A pulse width modulating unit, such as the pulse width modulating unit 1155 shown in FIG. 3, comprises a resistor R0, a capacitor C0 and a comparator A1. One terminal of the resistor R0 is connected to an output terminal of the first current source, an output terminal of the reference current unit, a terminal of the capacitor C0 and a negative terminal of the comparator A1. The other terminal of the resister R0 is connected to the other terminal of the capacitor C0 and the electrical ground. A positive terminal of the comparator A1, which collects the peak current feedback signal VCS, connects to a collecting unit, such as the collecting unit 1151 shown in FIG. 3. The negative terminal of the comparator A1 receives a first comparison voltage VOCP, where VOCP=R0*(I0+I1).

When the switch power supply is fully-loaded or overloaded, the output voltage of the switch power supply is small. Thus, the feedback voltage, which reflects the output voltage and is collected by the control IC, is also small and the error voltage VEA equals VDD. Controlled by the error voltage VEA, the first output current I1 reaches its maximum value corresponding to the maximum value of the error voltage VEA. Consequently, the voltage VOCP reaches its maximum value as well and the peak current Ip of the primary winding, which is obtained based on the peak current feedback signal VCS, is maintained. When the peak current Ip of the primary winding is maintained, the time during which the first comparator A1 generates the turn-off pulse OFF is a constant. And because the turn-on duty ratio of the switch transistor Q1 can be obtained from the time it receives the turn-on pulse ON of the control signal to the time it receives the turn-off pulse OFF of the control signal, the turn-on duty ratio of the switch transistor Q1 is maintained.

When the load of the switch power supply decreases to a certain degree, the output voltage of the switch power supply increases and the error voltage VEA decreases from VDD. The first output current I1 also decreases corresponding to the decrease of the error voltage VEA. In turn, the turn-on duty ratio of the switch transistor Q1 decreases. As a result, the output voltage of the switch power supply decreases and a negative feedback loop is formed. If, however, the load of the switch power supply increases, but to a degree that is less than a full load, the output voltage of the switch power supply decreases and the error voltage VEA increases correspondingly. The first output current I1 increases corresponding to the increase of the error voltage VEA. In turn, the turn-on duty ratio of the switch transistor Q1 increases. As a result, the output voltage of the switch power supply increases so that it can be stabilized.

FIG. 6 illustrates an exemplary circuit diagram corresponding to a PFM mode or a BURST mode. In some exemplary embodiments, the mode judging unit, such as the mode judging unit 1152 shown in FIG. 3, is represented by a third current source. The third current source can reduce a third output current I3 to less than a preset current value when the error voltage VEA is less than the second preset voltage. The third current source can maintain the value of the third output current I3 as a constant when the error voltage VEA is greater than or equal to the second preset voltage.

In FIG. 6, the frequency modulating unit, such as the frequency modulating unit 1156 shown in FIG. 3, comprises: a first capacitor C1; a second capacitor C2; a comparison A2; a first switch K1, of which a first terminal connects to an output terminal of the second current source and a second terminal connects to a first terminal of the first capacitor C1 and a negative terminal of the comparator A2, wherein the first switch K1 is configured to operate according to the degaussing time signal Tds; and a second switch K2, of which a first terminal connects to an output terminal of the third current source, a second terminal connects to the second terminal of the first switch K1, and a third terminal connects to a first terminal of the second capacitor C2 and a positive terminal of the comparator A2, wherein the second switch K2 is configured to connect the first terminal and the second terminal thereof or connect the first terminal with the third terminal thereof according to the degaussing time signal Tds. A detailed description of the operation of the exemplary circuit shown in FIG. 6 will be discussed below in association with FIG. 7.

FIG. 7 illustrates a timing diagram of an exemplary constant voltage and current module operating under the PFM/BURST mode, corresponding to the circuit shown in FIG. 6. In some exemplary embodiments, the operation of the control IC under the PFM/BURST mode includes four stages as shown in FIG. 7. Each of the four stages is discussed below.

During the first stage, the first capacitor C1 and the second capacitor C2 are both reset at the beginning of the first cycle T.

During the second stage, the switch transistor Q1 (not shown in FIG. 6) turns on when it receives the turn-on pulse ON of the control signal VCOMP. At this time, the degaussing time signal Tds is low and the third current source charges the second capacitor C2 with the third output current I3. As a result, the voltage across the second capacitor C2 (i.e., VC2), increases and the output signal VCOMP of the second comparator A2 changes to a high voltage level.

During the third stage, the turn-on period Ton of the switch transistor Q1 ends and the switch transistor Q1 turns off. Subsequently, the degaussing period starts. At this time, the degaussing time signal Tds is high, and both the second output current I2 and the third output current I3 charge the first capacitor C1. As a result, the voltage across the first capacitor C1 (i.e., VC1) increases while VC2 is unchanged or substantially unchanged. When VC1 is greater than VC2, the output of the second comparator A2 flips to a low voltage level from the high voltage level.

During the fourth stage, the degaussing period ends. At this time, VC1 is still greater than VC2 and the second comparator A2 still outputs a low voltage level. But the degaussing time signal Tds reverts back to low and thus VC1 is unchanged or substantially unchanged, while the third output current I3 continues to charge the second capacitor C2 until VC2 is greater than VC1. When VC2 is greater than VC1, the output of the second comparator A2 flips to a high voltage level, i.e., the control signal VCOMP becomes high. The second comparator A2 outputs a turn-on pulse ON, causing the switch transistor Q1 to turn on. The first capacitor C1 and the second capacitor C2 then reset, and the first operating cycle under the PFM/BURST mode ends.

According to the discussion above, the following formulas characterize operation:

$$\Delta Vc1 = \frac{(I2 + I3) \cdot Tds}{C1}; \quad (2)$$

$$Toff + Ton = \frac{C2 \cdot \Delta Vc1}{I3} = \frac{C2(I3 + I2) \cdot Tds}{I3 \cdot C1}; \text{ and} \quad (3)$$

$$\frac{Tds}{T} = \frac{Tds}{Tds + Ton + Toff} = \frac{I3 \cdot C1}{I3 \cdot C1 + C2(I3 + I2)}. \quad (4)$$

Formula (4) can be obtained by combining formulas (2) and (3).

As discussed above, when the switch power supply is fully-loaded or overloaded, the output voltage of the switch power supply is small. Thus, the feedback voltage, which reflects the output voltage and is collected by the control IC, is also small and the error voltage VEA equals VDD. When VEA equals VDD, the second output current I2 equals zero. That is, the second output current I2 changes in an opposite direction as that of the error voltage VEA. Meanwhile, the third output current I3 is unchanged. Therefore, the charging current of the first capacitor C1 and the second capacitor C2 are the same, i.e., they are both the third output current I3. According to formula (4) above, when I2=0, $$\frac{Tds}{T} = \frac{C1}{C1 + C2}. \quad (5)$$

That is, Tds/T is determined by the ratio of the first capacitor C1 and sum of the first capacitor C1 and second capacitor C2. And once the capacitance values of the first capacitor C1 and the second capacitor C2 are determined, Tds/T is a constant when the switch power supply outputs a constant current.

When the load of the switch power supply decreases to a certain degree, the output voltage of the switch power supply increases and the error voltage VEA decreases from VDD. Correspondingly, the second output current I2 increases. According to formula (4) above, an increase of the output current I2 can correspond to an increase of the operating cycle time T, which results in a decrease of the control IC's operating frequency fosc. When the operating frequency decreases, both the output power and the output voltage of the switch power supply decrease. Conversely, when the load of the switch power supply increases, the output voltage increases and the error voltage VEA increases. The second output current I2 decreases correspondingly. As a result, the control IC's operating frequency fosc increases, and the output voltage of the switch power supply increases. Thus, a negative feedback loop is formed for stabilizing the output voltage.

When error voltage VEA is between V1 and V2, i.e., V2<VEA<V1, the control IC enters both the PWM mode and the PFM mode. The second output current I2 varies opposite to the variation of the error voltage VEA. That is, when the error voltage VEA decreases, the second output current I2 increases. Hence, according to formula (4) above, Tds/T decreases when the error voltage VEA decreases, because the second output current I2 increases. And if Tds is kept constant, then the operating cycle time T increases. In other words, when the error voltage VEA decreases, the control IC's operating frequency fosc is reduced, realizing the pulse frequency modulation (PFM).

When error voltage VEA is less than the preset voltage V4, the control IC enters the BURST mode, during which the second output current I2 is maintained and the third output current I3 is changed to a small value and maintained. Thus, according to formula (4), Tds/T decreases further because the operating cycle time T increases. As a result, the operating frequency fosc decreases further until the control IC no longer operates under the BURST mode. When the error voltage VEA is less than V4, it indicates that the switch power supply is lightly loaded or unloaded. Accordingly, the decrease of the control IC's operating frequency fosc reduces the switching loss of the switch power supply and thus reduces the standby power consumption.

FIG. 8 illustrates a block diagram of an exemplary switch power supply. As shown in FIG. 8, a switch power supply comprises: a control integrated circuit IC1 such as the control IC shown in FIG. 2; an input filter and rectification module 11, configured to filter a first alternating current (AC) voltage for obtaining desired frequencies and convert the first alternating current (AC) voltage to a first direct current (DC) voltage; a primary winding 13 of a transformer, configured to convert the first DC voltage to an electromagnetic signal, wherein the conversion is controlled by the switch transistor Q1; a power supply module 14, configured to provide a power supply voltage to the control integrated circuit IC1; a primary side feedback module 15, configured to divide the power supply voltage and provide the divided power supply voltage to the control integrated circuit IC1; a primary collecting module 16, configured to collect the peak current feedback signal; a secondary winding 17 of the transformer, configured to convert the electromagnetic signal to an electric signal and generate a second AC voltage corresponding to the electric signal; an output rectification module 18, configured to convert the second AC voltage to a second DC voltage; a voltage regulating module 19, configured to store the energy provided by the output rectification module and provide output power for stabilizing an output DC voltage of the switch power supply when the switch transistor Q1 is turned off; and a dummy load module 20, configured to consume energy generated by the secondary winding when the switch power supply carries no load.

In FIG. 8, the control IC1 can include an error amplifying module, such as the error amplifying module 113 shown in FIG. 2. As discussed above in association with FIG. 2, the error amplifying module compares a feedback voltage and a reference voltage and generates an error voltage, which is for determining the load condition of the switch power supply. Based on the load condition, the degaussing time signal and the peak current feedback signal, the frequency and duty ratio of the control signal can be adjusted to stabilize the output voltage and output current of the switch power supply. Moreover, the operating frequency of the control IC can be reduced when the system is under a lightly loaded or unloaded condition. As a result, the switching loss of the power supply system is reduced so that the standby power consumption can be reduced.

As shown in FIG. 8, in some exemplary embodiments, the switching power supply system further comprises a first voltage absorbing module 21 coupled to the input filter and rectification module 11 and the primary winding 13 of the transformer, wherein the first voltage absorbing module 21 is configured to absorb a first peak voltage caused by leakage inductance of the primary winding to protect the switch transistor Q1.

In some exemplary embodiments, the switch power supply further comprises a second voltage absorbing module 22 coupled to the secondary winding 17 of the transformer and the voltage regulating module 19, wherein the second voltage absorbing module 22 is configured to absorb a second peak voltage generated during the reverse recovery stage of the output rectification module 18.

FIG. 9 illustrates a circuit diagram of an exemplary switch power supply corresponding to the block diagram shown in FIG. 8. In FIG. 9, the primary side of the switch power supply includes a primary winding Np of a transformer, a switch transistor Q1 configured to control the primary winding Np, and a control integrated circuit IC1 configured to control the operation of the switch transistor Q1. The switch power supply further comprises a fuse FR1 configured to disconnect the AC voltage input for protecting the system when a circuit fault occurs.

In FIG. 9, diodes D1-D4, configured to convert the input alternating current (AC) voltage to a direct current (DC) voltage, form a full wave rectifier. Capacitors C01, C02, and inductance L1 form a filter, which is configured to filter out interfering signals in the input AC voltage and reduce voltage ripples. The diodes D1-D4, the capacitors C01, C02, and the inductance L1 form an exemplary circuit corresponding to the input filter and rectification module 11 shown in FIG. 8.

In FIG. 9, an exemplary circuit corresponding to the power supply module 14 shown in FIG. 8 can include resistors R3 and R4, a capacitor C4, an auxiliary winding Nd and a diode D6. The resistors R3, R4, and the capacitor C4 form a startup circuit for starting the control circuit IC1. The capacitor C4 is charged by current flowing through the resistors R3 and R4.

When the power supply voltage provided to the control circuit IC1, i.e., the voltage across the capacitor C4, reaches a preset startup value, the switch power supply starts its normal operation. Subsequently, the primary winding Np starts to store energy until the primary side current reaches a certain value and the switch transistor Q1 is turned off. The primary side current is determined by the control circuit IC1's voltage sampling of the resistor R9. After the system starts its normal operation, the system's power supply is provided through the auxiliary winding Nd and the diode D6.

In some exemplary embodiments, the output voltage of the auxiliary winding Nd is divided by the resistors R6 and R7. The divided voltage is provided to the control circuit IC1 as a voltage feedback signal. The control circuit IC1 also samples the voltage across the resistor R9 to obtain the peak current feedback signal. The voltage sampling of the resistor R9 allows the control circuit IC1 to determine the load condition of the switch power supply and adjust the operation of the switch transistor Q1 accordingly.

At the output side, when the switch transistor Q1 is turned off, the energy of the primary winding Np is coupled to the secondary winding Ns. The output AC voltage of the secondary winding Ns is rectified by the diode D7 and becomes a DC voltage. The diode D7 is an exemplary circuit corresponding to the output rectification module shown in FIG. 8. The output DC voltage generated by the diode D7 is then stored in the capacitor C7, which provides the output voltage when the switch transistor Q1 is turned off. Thus, the system output voltage can be stabilized. In some exemplary embodiments, the switch power supply can also include a resistor R12, corresponding to the dummy load module 20 as shown in FIG. 8. The resistor R12 can be configured to consume energy generated by the secondary winding Ns, thus stabilizing the output voltage.

In the preceding specification, the subject matter has been described with reference to specific exemplary embodiments. It will, however, be evident that various modifications and changes may be made without departing from the broader spirit and scope of the claimed subject matter as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed is:

1. A control integrated circuit for controlling a switch power supply, comprising:
   a voltage collecting module, configured to collect a feedback voltage based on an output voltage of the switch power supply;
   an error amplifying module, configured to compare the feedback voltage with a reference voltage and generate an error voltage;
   a time collecting module, configured to obtain a degaussing time signal based on the feedback voltage; and
   a voltage and current stabilizing module, configured to collect a peak current feedback signal of a switch transistor, generate a control signal based on the error voltage, the degaussing time signal and the peak current feedback signal, wherein the control signal is for controlling an operating frequency and a duty ratio of the switch transistor, and control the switch transistor according to the control signal;
   wherein the voltage and current stabilizing module comprises:
      a collecting unit, configured to collect the peak current feedback signal;
      a mode judging unit, configured to modulate a judging current according to the error voltage;
      a mode controlling unit, configured to modulate a controlling current according to the error voltage;
      a reference current unit, configured to generate a preset current;
      a pulse width modulating unit, configured to
         obtain a first comparison voltage based on the controlling current that is superimposed with the preset current, and
         generate a turn-off pulse for the control signal when the first comparison voltage equals the voltage of the peak current feedback signal; and
      a frequency modulating unit, configured to generate a turn-on pulse for the control signal based on the judging current, the controlling current and the degaussing time signal.

2. The control integrated circuit of claim 1, wherein the mode controlling unit comprises:
   a first current source connected with the pulse width modulating unit, and configured to increase a first output current when the error voltage increases; and
   a second current source connected with the frequency modulating unit, and configured to increase a second output current when the error voltage decreases, stop providing the second output current when the error voltage equals a first preset voltage, and maintain the second output current when the error voltage is less than a second preset voltage.

3. The control integrated circuit of claim 2, wherein the reference current unit includes a constant current source.

4. The control integrated circuit of claim 3, wherein the pulse width modulating unit comprises a resistor, a capacitor, and a comparator, wherein
   one terminal of the resistor is connected to an output terminal of the first current source, an output terminal of the reference current unit, a terminal of the capacitor, and a negative terminal of the comparator,
   the other terminal of the resistor is connected to the other terminal of the capacitor and an electrical ground, and
   a positive terminal of the comparator is connected to the collecting unit.

5. The control integrated circuit of claim 2, wherein the mode judging unit comprises a third current source, the third current source being configured to reduce a third output current to less than a preset current value when the error voltage is less than the second preset voltage, or maintain the third output current when the error voltage is greater than or equal to the second preset voltage.

6. The control integrated circuit of claim 5, wherein the frequency modulating unit comprises:
   a first capacitor;
   a second capacitor;
   a comparator;
   a first switch, of which a first terminal connects to an output terminal of the second current source and a second terminal connects to a first terminal of the first capacitor and a negative terminal of the comparator, wherein the first switch is configured to operate according to the degaussing time signal; and
   a second switch, of which a first terminal connects to an output terminal of the third current source, a second terminal connects to a second terminal of the first switch, and a third terminal connects to a first terminal of the second capacitor and a positive terminal of the comparator, wherein the second switch is configured to connect the first terminal and the second terminal thereof or connect the first terminal and the third terminal thereof according to the degaussing time signal.

7. The control integrated circuit of claim 1, further comprising:
a circuit starting module, configured to generate an enable signal when the voltage of a power supply module is equal to or greater than a preset startup voltage.

8. The control integrated circuit of claim 7, wherein the voltage and current stabilizing module is further configured to provide the control signal when receiving the enable signal.

9. The control integrated circuit of claim 1, further comprising a compensating module, configured to compensate the feedback voltage according to the error voltage.

10. A switch power supply comprising:
a switch transistor;
a control integrated circuit coupled to the switch transistor comprising:
    a voltage collecting module, configured to collect a feedback voltage based on an output voltage of the switch power supply,
    an error amplifying module, configured to compare the feedback voltage with a reference voltage and generate an error voltage,
    a time collecting module, configured to obtain a degaussing time signal based on the feedback voltage;
    a voltage and current stabilizing module, configured to
        collect a peak current feedback signal of the switch transistor, and
        generate a control signal based on the error voltage and the peak current feedback signal, wherein the control signal is for controlling the switch transistor;
    wherein the voltage and current stabilizing module comprises:
        a collecting unit, configured to collect the peak current feedback signal;
        a mode judging unit, configured to modulate a judging current according to the error voltage;
        a mode controlling unit, configured to modulate a controlling current according to the error voltage;
        a reference current unit, configured to generate a preset current;
        a pulse width modulating unit, configured to
            obtain a first comparison voltage based on the controlling current that is superimposed with the preset current, and
            generate a turn-off pulse for the control signal when the first comparison voltage equals the voltage of the peak current feedback signal; and
        a frequency modulating unit, configured to generate a turn-on pulse for the control signal based on the judging current, the controlling current and the degaussing time signal;
an input filter and rectification module, configured to filter a first alternating current (AC) voltage for obtaining desired frequencies and convert the first alternating current (AC) voltage to a first direct current (DC) voltage;
a power supply module, configured to provide a power supply voltage to the control integrated circuit;
a feedback module, configured to provide the feedback voltage and the peak current feedback signal to the control integrated circuit; and
a converting module controlled by the switch transistor, configured to convert the first DC voltage to a second DC voltage.

11. The switch power supply of claim 10, wherein the control signal is generated further based on the degaussing time signal.

12. The switch power supply of claim 10, wherein the mode controlling unit comprises:
a first current source connected with the pulse width modulating unit and configured to increase a first output current when the error voltage increases; and
a second current source connected with the frequency modulating unit and configured to
    increase a second output current when the error voltage decreases,
    stop providing the second output current when the error voltage equals a first preset voltage, and
    maintain the second output current when the error voltage is less than a second preset voltage.

13. The switch power supply of claim 12, wherein the reference current unit includes a constant current source.

14. The switch power supply of claim 13, wherein the pulse width modulating unit comprises a resistor, a capacitor, and a comparator, wherein
one terminal of the resistor is connected to an output terminal of the first current source, an output terminal of the reference current unit, a terminal of the capacitor, and a negative terminal of the comparator,
the other terminal of the resistor is connected to the other terminal of the capacitor and an electrical ground, and
a positive terminal of the comparator is connected to the collecting unit.

15. The switch power supply of claim 12, wherein the mode judging unit comprises a third current source, the third current source being configured to
reduce a third output current to less than a preset current value when the error voltage is less than the second preset voltage, or
maintain the third output current when the error voltage is greater than or equal to the second preset voltage.

16. The switch power supply of claim 15, wherein the frequency modulating unit comprises:
a first capacitor;
a second capacitor;
a comparator;
a first switch, of which a first terminal connects to an output terminal of the second current source and a second terminal connects to a first terminal of the first capacitor and a negative terminal of the comparator, wherein the first switch is configured to operate according to the degaussing time signal; and
a second switch, of which a first terminal connects to an output terminal of the third current source, a second terminal connects to a second terminal of the first switch, and a third terminal connects to a first terminal of the second capacitor and a positive terminal of the comparator, wherein the second switch is configured to connect the first terminal and the second terminal thereof or connect the first terminal and the third terminal thereof according to the degaussing time signal.

17. The switch power supply of claim 10, wherein the control integrated circuit further comprises a compensating module, configured to compensate the feedback voltage according to the error voltage.

18. The switch power supply of claim 10, wherein the converting module comprises:
a primary winding, configured to convert the first DC voltage to an electromagnetic signal, wherein the conversion is controlled by the switch transistor;

a secondary winding, configured to convert the electromagnetic signal to an electric signal and generate the second AC voltage corresponding to the electric signal; and an output rectification module, configured to convert the second AC voltage to the second DC voltage.

19. The switch power supply of claim 18, further comprising:

a voltage regulating module, configured to store the energy provided by the output rectification module and provide output power for stabilizing the output voltage of the switch power supply when the switch transistor is turned off.

20. The switch power supply of claim 19, further comprising a dummy load module, configured to consume energy generated by the secondary winding when the switch power supply carries no load.

21. The switch power supply of claim 20, further comprising a second voltage absorbing module coupled between the secondary winding and the voltage regulating module, wherein the second voltage absorbing module is configured to absorb a second peak voltage generated during a reverse recovery stage of the output rectification module.

22. The switch power supply of claim 18, further comprising a first voltage absorbing module coupled between the input filter and rectification module and the primary winding, wherein the first absorbing module is configured to absorb a first peak voltage caused by leakage inductance of the primary winding.

* * * * *